(12) United States Patent
Roither et al.

(10) Patent No.: US 8,636,436 B2
(45) Date of Patent: Jan. 28, 2014

(54) DEVICE WITH AT LEAST TWO PARTS MOVING RELATIVE TO EACH OTHER

(75) Inventors: Andreas Roither, Enger (DE); Carsten Both, Minden (DE)

(73) Assignee: DewertOkin GmbH, Kirchlengern (DE)

( * ) Notice: Subject to any disclaimer, the term of this patent is extended or adjusted under 35 U.S.C. 154(b) by 208 days.

(21) Appl. No.: 13/049,048

(22) Filed: Mar. 16, 2011

(65) Prior Publication Data
US 2011/0229252 A1 Sep. 22, 2011

(30) Foreign Application Priority Data
Mar. 16, 2010 (DE) .......................... 20 2010 003 706

(51) Int. Cl.
*F16B 7/14* (2006.01)

(52) U.S. Cl.
USPC .......................... 403/107; 403/109.8; 403/368

(58) Field of Classification Search
CPC ....................................................... F16B 7/10
USPC .............. 403/2, 109.1, 109.2, 109.5, 109.7, 403/109.8, 262, 366–369, 374.1, 374.4, 403/380, 409.1, DIG. 11, 105, 107
See application file for complete search history.

(56) References Cited

U.S. PATENT DOCUMENTS

| | | | |
|---|---|---|---|
| 3,285,207 A | 11/1966 | Muller Vom Hagen | |
| 3,291,079 A | 12/1966 | Ruda | |
| 3,841,695 A * | 10/1974 | Woodward | 296/43 |
| 3,860,350 A * | 1/1975 | Rogers | 403/104 |
| 4,317,416 A * | 3/1982 | Baum et al. | 108/157.1 |
| 4,407,603 A * | 10/1983 | Lundgren | 403/370 |
| 4,470,716 A * | 9/1984 | Welch | 403/254 |
| 4,913,580 A * | 4/1990 | Whitehead | 403/326 |
| 6,604,886 B2 * | 8/2003 | Kinzler et al. | 403/370 |
| 6,755,590 B1 * | 6/2004 | Luetzow et al. | 403/374.3 |
| 7,025,383 B2 * | 4/2006 | Canale | 285/7 |
| 7,497,014 B2 * | 3/2009 | Muller | 29/898.03 |
| 7,954,289 B2 * | 6/2011 | Evans | 52/298 |
| 2013/0146296 A1 * | 6/2013 | Ellison | 166/335 |

FOREIGN PATENT DOCUMENTS

| | | |
|---|---|---|
| DE | 19639691 | 10/1997 |
| DE | 202008000628 | 4/2008 |
| WO | 2007061358 A1 | 5/2007 |

* cited by examiner

*Primary Examiner* — Joshua Kennedy
(74) *Attorney, Agent, or Firm* — Grossman Tucker Perreault & Pfleger, PLLC

(57) ABSTRACT

On a device with at least first and second parts moveable relative to each other, comprising a sliding bearing located on the first part, comprising a sliding element and an adjusting element within in a very small gap between the two parts moveable relative to each other, and for inexpensive manufacture and simple assembly, that the first part displays a recess, located outside the area in which the adjusting element is supported on the first part, in which a projection located on the sliding element is mounted in positive fashion in the direction of actuation of the displacement of the adjusting element.

29 Claims, 10 Drawing Sheets

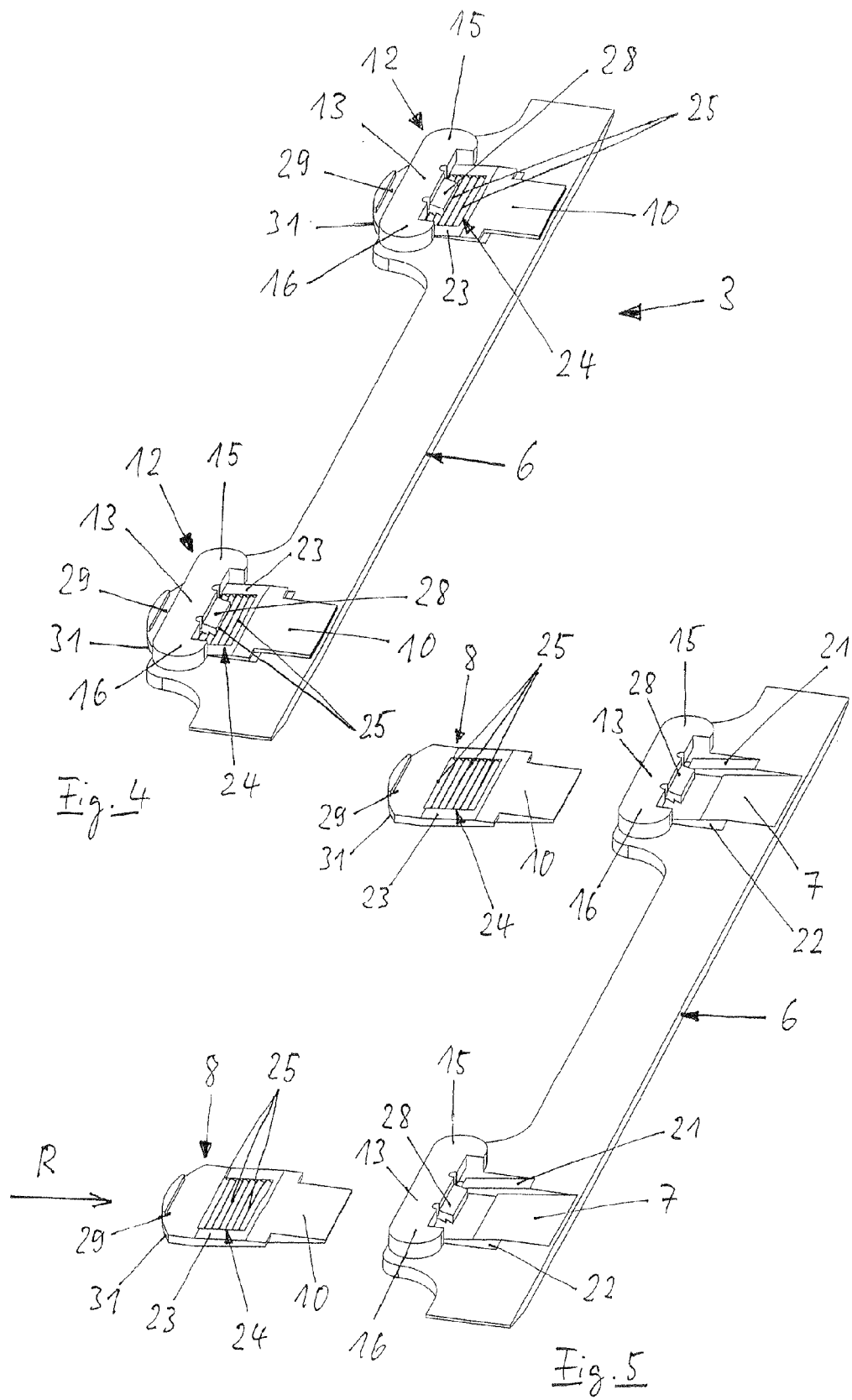

Figure 1:
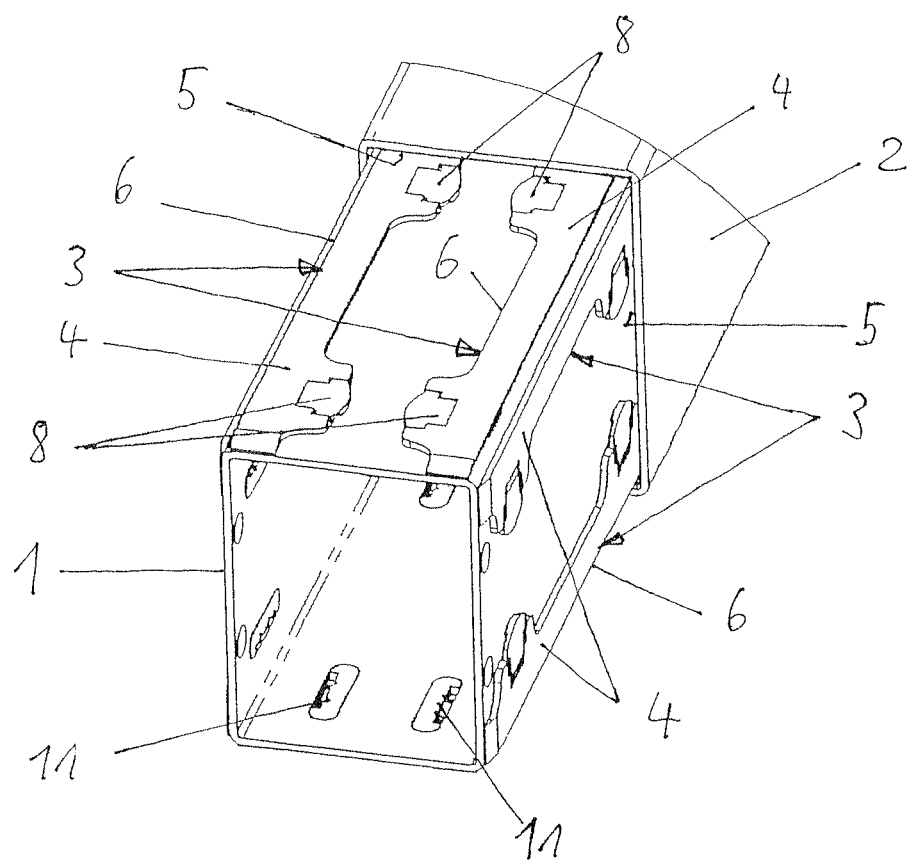

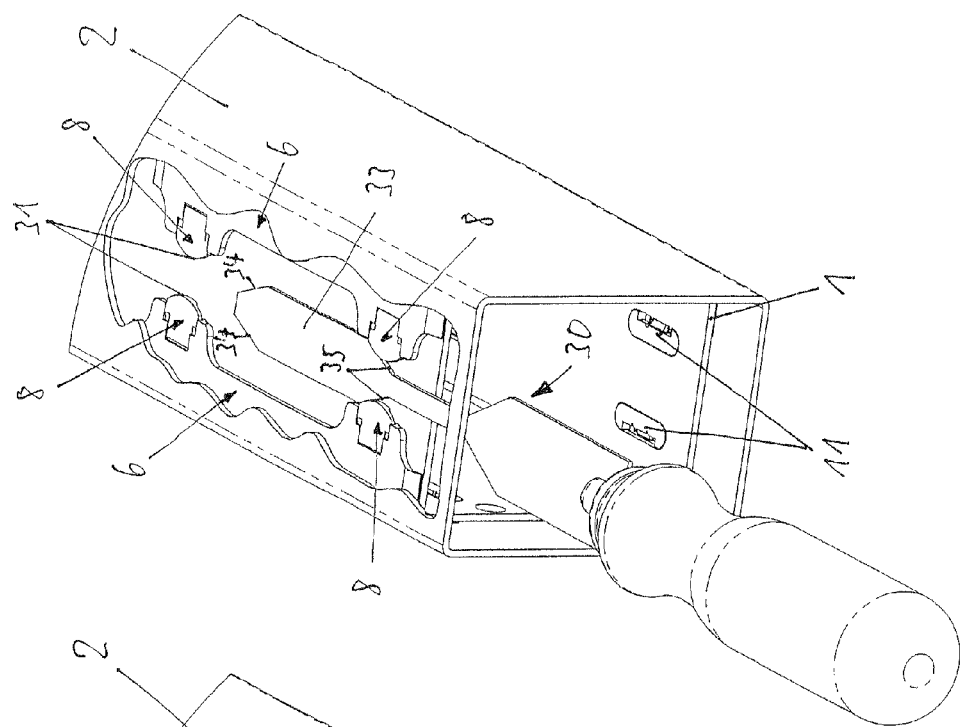
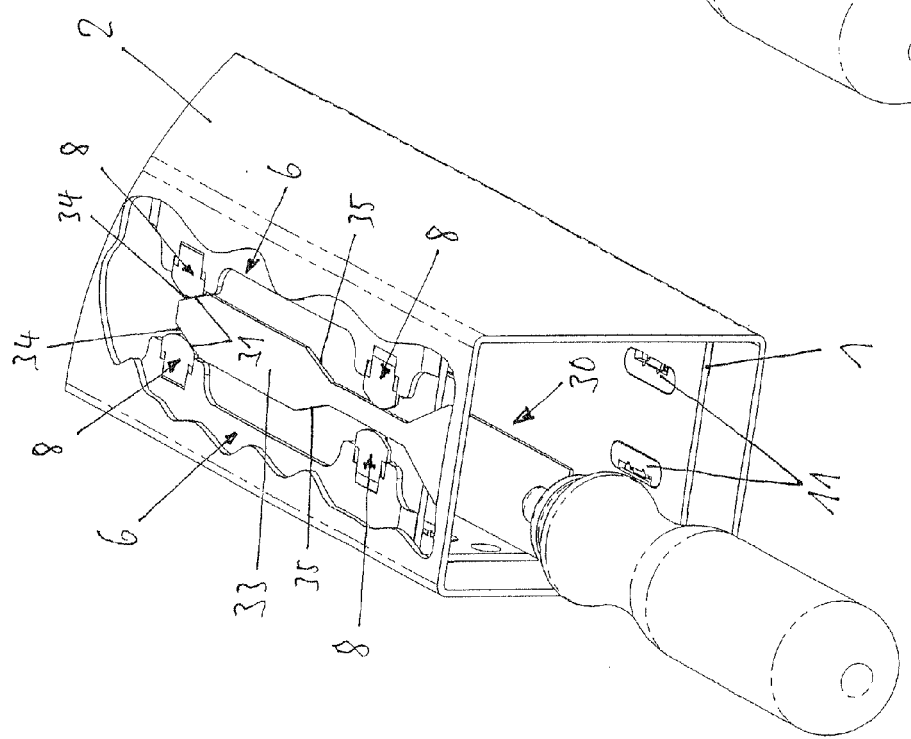

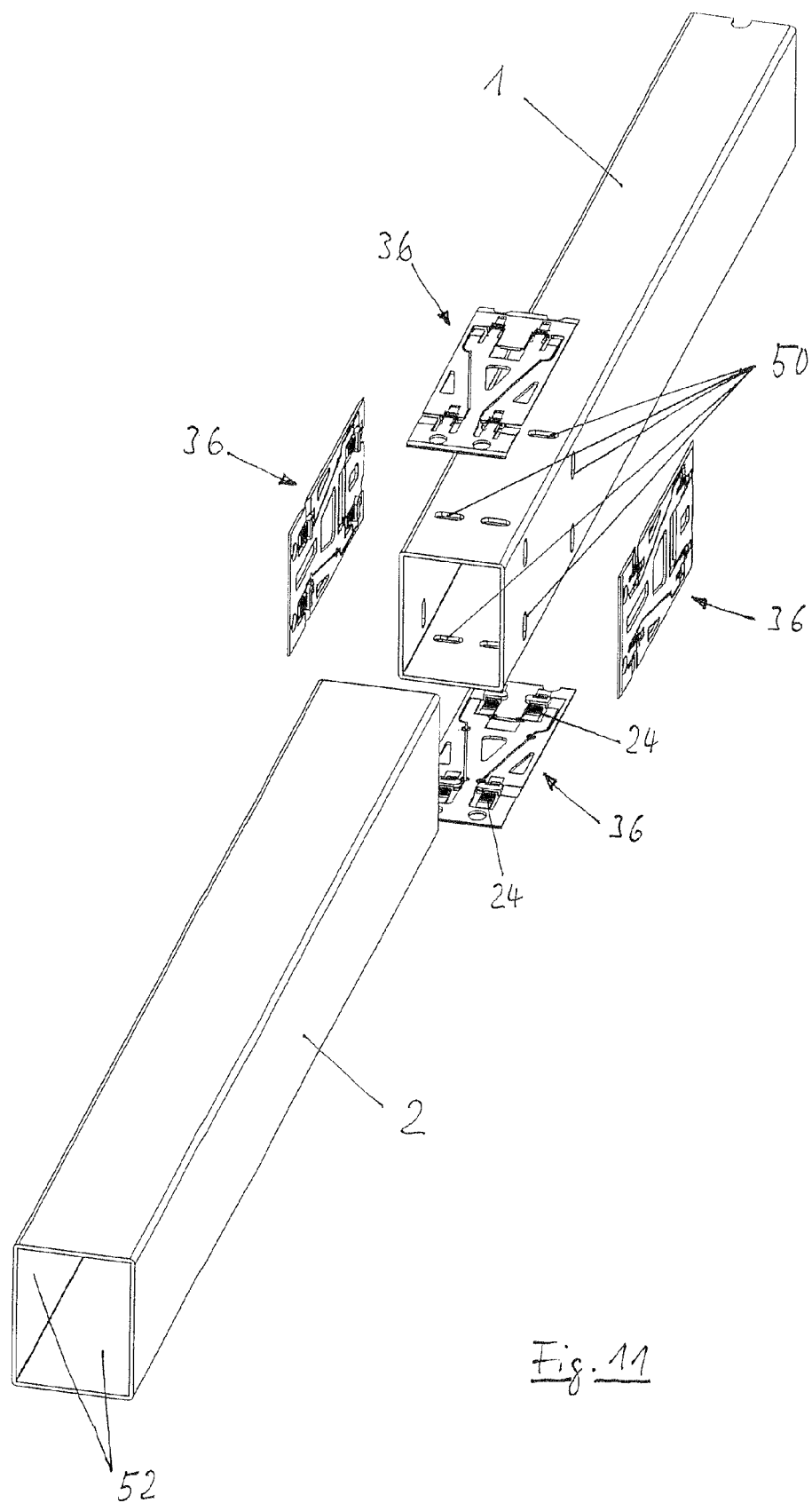

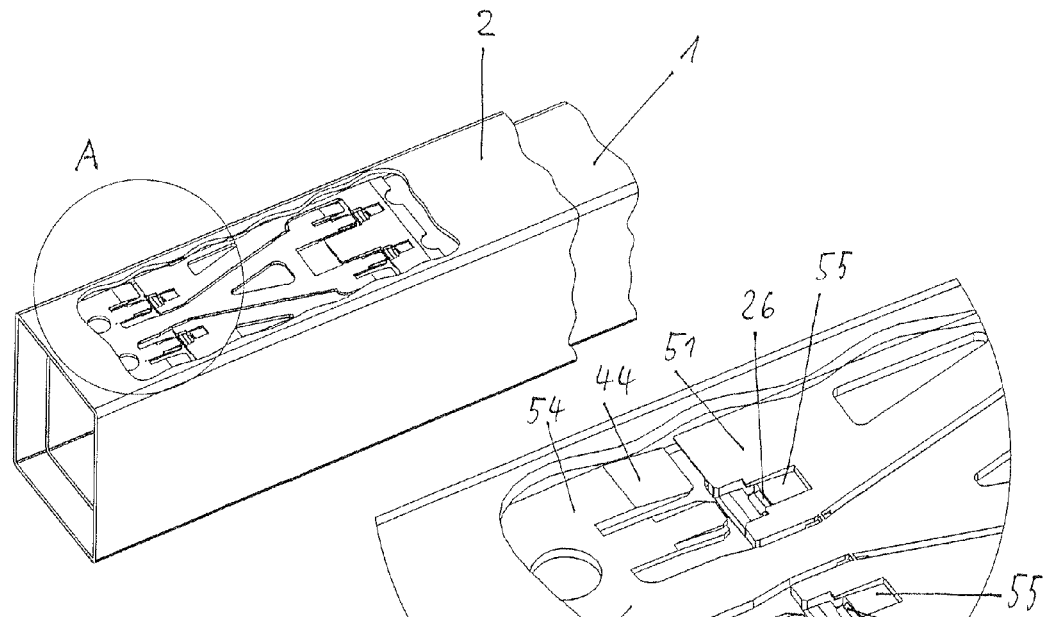
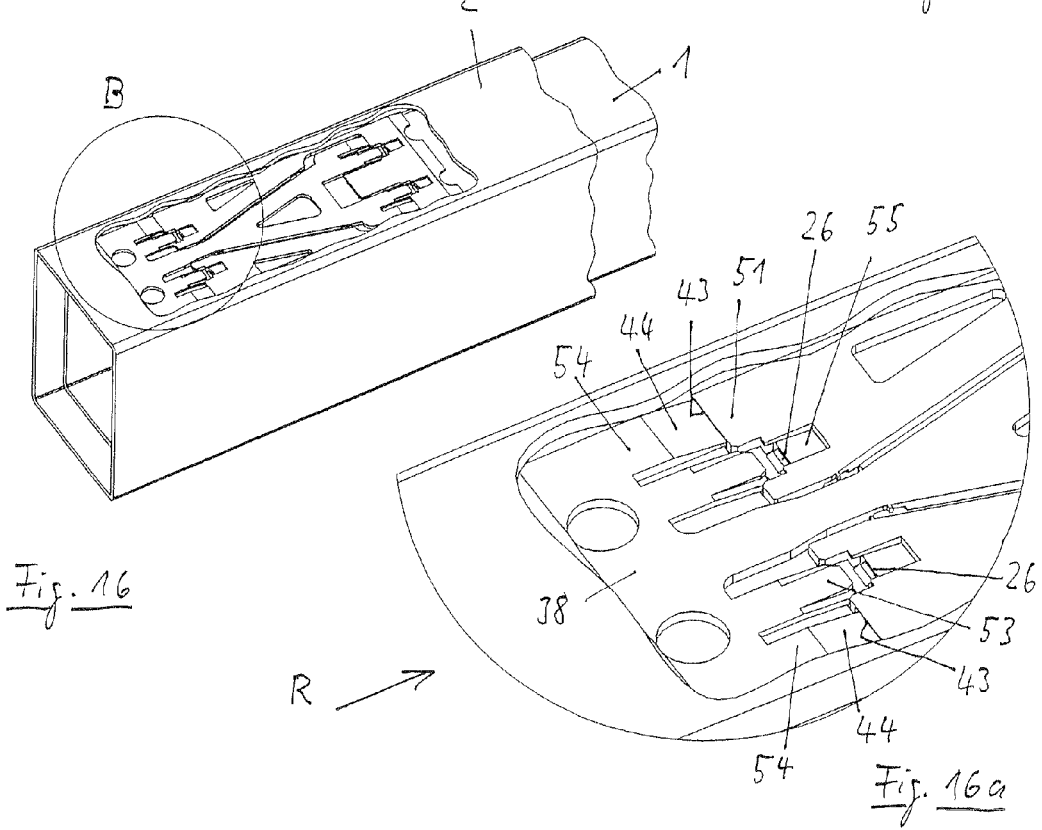

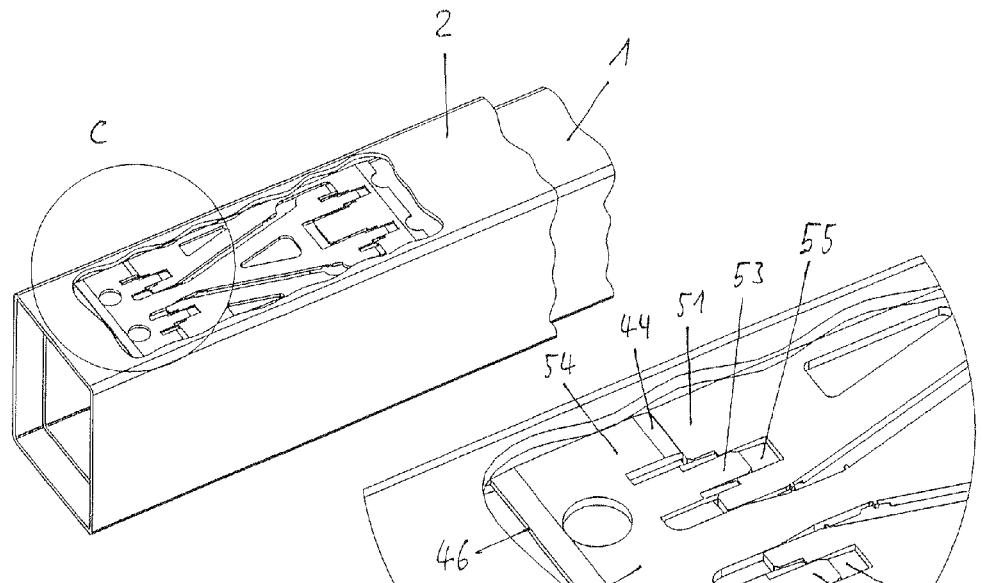
Fig. 17
Fig. 17a
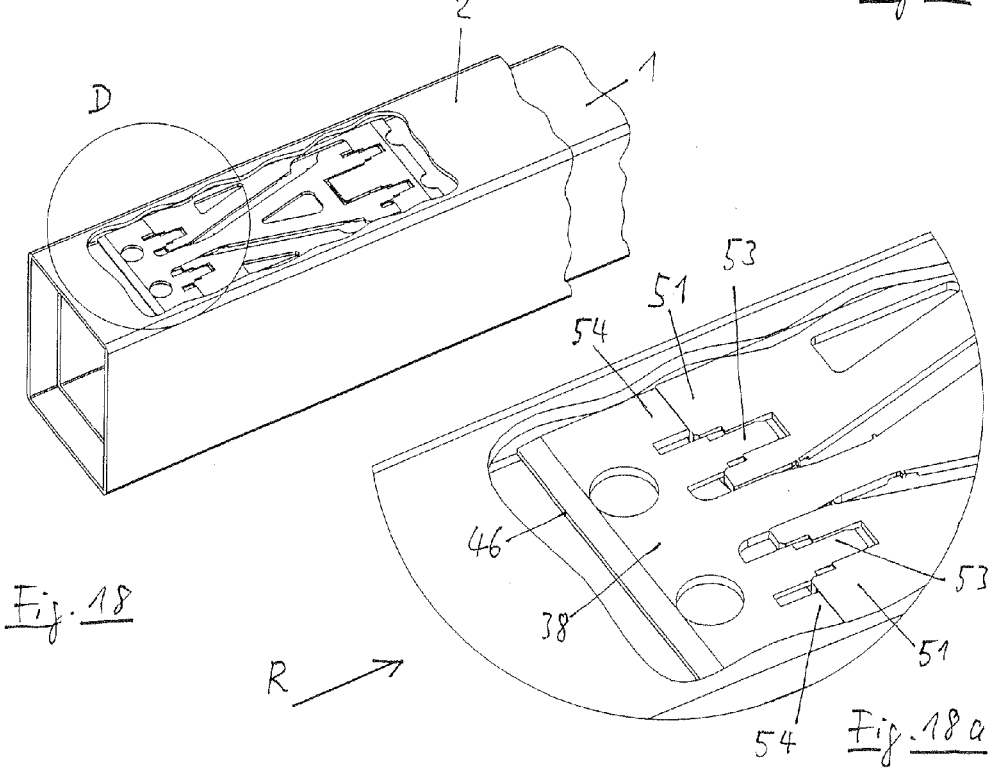
Fig. 18
Fig. 18a

DEVICE WITH AT LEAST TWO PARTS MOVING RELATIVE TO EACH OTHER

The invention relates to a device with at least two parts moving relative to each other along sliding surfaces, where a sliding bearing with a first sliding surface is located on at least one first part, said first sliding surface lying opposite a second sliding surface provided on a second part, the sliding bearing comprises a sliding element on which the first sliding surface is formed, and on the side of which facing away from the first sliding surface a first contact surface, inclined relative to the first sliding surface, is provided, and an adjusting element having a second contact surface that lies on the first contact surface in a manner permitting displacement in a direction of actuation and, in this context, is supported on the first part by a third contact surface, facing away from the second contact surface, such that, by displacing the adjusting element in its direction of actuation, the sliding element with the first sliding surface can be moved towards the second sliding surface of the second part.

In particular, the invention relates to a telescopic column with at least two tubular parts, located one inside the other, that displays the characteristics indicated above. A telescopic column of this kind can, in particular, be designed as a lifting column that is mainly used in the furniture sector, e.g. on tables, beds, etc. of adjustable height. Other fields of application are likewise open to consideration. On a telescopic column of this kind having at least two tubular parts located one inside the other, one or more sliding bearings can be located on one or more outer sides of the inner part and/or on one or more inner sides of the outer part.

Devices or telescopic columns of the kind indicated above are known in various versions from the prior art. To keep the space between the parts moving relative to each other as small as possible, and to minimize the assembly effort and the associated manufacturing costs, sliding bearings are used with preference for sliding guidance of the parts moving relative to each other. In this context, it is desirable for the parts or the telescopic tubes to be guided with the least possible amount of play. Owing to manufacturing tolerances in relation to the dimensional accuracy and geometry of the parts, it is moreover desirable for the play to be adjustable, such that the play of the sliding guide can be compensated for.

To compensate for the play, it is known practice to provide a wedge-shaped adjusting element that interacts with a corresponding, likewise wedge-shaped sliding element in such a way that, by displacing the adjusting element, the sliding surface of the sliding element can be moved towards the sliding surface provided on the other part. However, a sliding bearing of this kind, with a suitable facility for displacing the adjusting element, takes up a relatively large amount of space that has to be provided between the two parts, or in at least one of the parts.

Particularly on telescopic columns used for the furniture sector, the space between the tubular telescopic parts should be of very small dimensions for design-related reasons. The thickness of the telescopic parts is likewise very small, meaning that areas of the sliding bearing cannot be accommodated therein.

The object of the present invention is to provide a sliding guide for a device of the kind mentioned in the opening paragraph that can be inserted in a very small gap between the parts moving relative to each other, particularly tubular telescopic parts, and is moreover inexpensive to manufacture and easy to install on the parts.

According to the invention, the object is solved in that, on a device of the kind mentioned on the opening paragraph, the first part displays a recess, located outside the area in which the adjusting element is supported on the first part by the third contact surface, in which a projection located on the sliding element is mounted in positive fashion in the direction of actuation of the displacement of the adjusting element.

The projection is preferably mounted in the recess in a manner permitting displacement towards the second part.

Owing to the design according to the invention, no more space is required between the two parts in the area of the sliding guide than taken up by the sliding element and the adjusting element interacting with it. All that is necessary in the part on which the sliding bearing is located, is a recess for retaining or guiding a projection located on the sliding element, such that, when the adjusting element is displaced in its direction of actuation, the sliding element is positively retained and can be moved towards the sliding surface of the other part. The recess in the part displaying the sliding bearing can thus be kept relatively small. It can be designed as a through hole in the part in question, e.g. the tubular telescopic part.

The sliding element is preferably designed in the form of a relatively thin plate, where the first sliding surface is located on one of its larger side surfaces, the projection being located on its opposite, other larger side surface. The adjusting element can likewise be of plate-like design, in which context its thickness can preferably be equal to, or less than, the thickness of the plate-like sliding element. The height of the projection located on the side of the sliding element facing away from the sliding surface is preferably smaller than, or equal to, the depth of the recess. If the recess is designed as a through hole in the part in question, the height of the projection should at most correspond to the thickness of the part in question on which the sliding bearing is located.

The sliding element is preferably made of a plastic having high surface slip.

In a special development of the invention, the sliding element can comprise multiple first contact surfaces that interact with their associated adjusting elements. In this case, the first sliding surface provided on the sliding bearing can be of relatively large design, in which context the play can be compensated for at several points in the area of the first contact surfaces by means of the adjusting elements assigned to them. This embodiment permits independent adjustment of the play at the corresponding points of the sliding element, meaning that the possibly different play in different areas of the parts to be guided on each other can be compensated for.

In another embodiment, a single adjusting element with multiple second contact surfaces can be provided, instead of multiple adjusting elements, said second contact surfaces each interacting with a first contact surface of the sliding element assigned to the second contact surface in question. This solution has the advantage that it is particularly easy to set the play between the sliding element of the first part and the second part moving relative to it by actuating one adjusting element.

The sliding element is preferably of one-piece design in these embodiments.

The adjusting element is likewise preferably manufactured in one piece.

In a special embodiment of the invention, the first and second contact surfaces of the sliding element and of the adjusting element(s) are inclined in relation to the longitudinal direction of the relative displacement of the two parts, such that the adjusting element(s) can be moved in the longitudinal direction of the relative displacement of the two parts to set the play.

In another embodiment of the invention, the first and second contact surfaces are inclined in relation to a plane lying perpendicularly to the longitudinal direction of the relative displacement of the two parts and parallel to the sliding surfaces, such that the adjusting element(s) can be moved transversely to the longitudinal direction of the relative displacement of the two parts to set the play. This embodiment has the advantage that the adjusting element(s) cannot be unintentionally displaced during relative movement of the two parts.

In a preferred development of the invention, the respective adjusting element is guided on or in the sliding element in its direction of actuation.

In particular, the adjusting element can be guided on or in the sliding element in such a way that movement opposite to the direction of actuation of the adjusting element is inhibited or blocked by a resistance. As a result of a measure of this kind, the respective adjusting element can, once it has been displaced to set the play, only be moved back in the direction opposite to its direction of actuation by overcoming a resistance, or not without damaging the sliding bearing. In the latter case, provision can be made for the adjusting element in question to be disengaged from the sliding element after disassembly of the sliding bearing, and re-used for setting the play after being installed again.

In a preferred embodiment, snap-in means are located on the sliding element and the adjusting element, and designed in such a way that the interaction of the snap-in means generates the resistance counteracting backward movement of the adjusting element.

According to another embodiment, the snap-in means can be replaced or supplemented by resistance means that demonstrate a resistance to releasing as a result of a frictional clamping force, or as a result of a bonded connection, or combinations thereof.

In this context, the adjusting element and/or the sliding element and/or the sliding bearing is designed in such a way that the adjusting element is guided relatively on the corresponding parts, but in moving fashion thereon, and can subsequently or simultaneously be fixed in place by clamping or by bonding.

In a development of all embodiments, a releasing means for eliminating the resistance is provided that can be integrally molded on the adjusting element and/or the sliding bearing and/or can be applied to them, where the releasing means is designed to be actuated by an auxiliary tool, for example, or itself consists of an auxiliary tool, or is designed to be manually actuated in some other way.

The snap-in means can consist of a row of snap-in elements arranged a distance apart from each other in the direction of actuation of the adjusting element, such that snap-in engagement of the adjusting element and the sliding element takes place in multiple positions along the displacement path of the adjusting element. This makes it possible to gradually adjust, and particularly reduce, the play between the sliding element and the second part moving relative to it.

The snap-in elements can be designed as teeth, which can have a pointed or rounded shape. In this context, the flanks of the teeth can be designed in such a way that the flanks absorbing the force when the adjusting element is moved in its direction of actuation are arranged at an angle other than 90° relative to the direction of actuation, such that, when force is applied to the adjusting element, the teeth can move over each other into a locking position. Backward movement of the adjusting element, in the direction opposite to the direction of actuation, can be inhibited by the tooth flanks absorbing the forces in this context being arranged at a steeper angle relative to the direction of movement. To block backward movement, the flanks absorbing the forces in this context can be aligned essentially perpendicularly to the direction of movement.

In an advantageous embodiment, the snap-in means located on the adjusting element and the second contact surface of the adjusting element can be provided on sides of the adjusting element that face away from each other.

In a special embodiment, the snap-in means and the second contact surface of the adjusting element in question can be provided in opposite areas of the adjusting element, seen in the direction of actuation of the adjusting element. In this context, the snap-in means and the second contact surface can be located in an offset position in relation to each other in the direction of actuation of the adjusting element.

In another embodiment, the snap-in means located on the adjusting element and the second contact surface can be provided in areas of the adjusting element laterally offset relative to each other, seen in the direction of actuation of the adjusting element. In this context, the snap-in means and the second contact surface can also be arranged in an offset position relative to each other in the direction of actuation of the adjusting element.

If the snap-in means and the second contact surface are laterally offset relative to each other, the snap-in means can be provided on a finger-like part extending in the direction of actuation of the adjusting element that is positioned laterally separately from the part of the adjusting element displaying the second contact surface. The finger-like part can display a smaller thickness than the other sub-areas of the adjusting element, such that it can be bent with a desired elasticity, and the snap-in means on the finger-like part of the adjusting element and the snap-in means of the sliding element can interact more elastically when the adjusting element is displaced in its direction of actuation.

In a preferred development of the invention, the projection located on the sliding element is designed in such a way that it reaches over the adjusting element in the area of its snap-in means by means of a web on which the snap-in means of the sliding element is located in such a way that it can interact with the snap-in means of the adjusting element when the latter is displaced in its direction of actuation.

As already described above, the snap-in means of the adjusting element can advantageously display a row of snap-in elements arranged a distance apart from each other in the direction of actuation of the adjusting element, particularly teeth arranged one behind the other. The row of snap-in elements can be located in a plane that, in relation to the third contact surface, on which the adjusting element rests on the first part, is inclined towards this third contact surface in the direction of actuation of the adjusting element.

The snap-in means located on the web of the sliding element preferably consists of one or just a few snap-in elements corresponding to the snap-in elements of the adjusting element, the number of which is smaller than the number of snap-in elements of the adjusting element. In the initial actuating position of the adjusting element, where the first and second contact surfaces rest on each other, but the sliding surface of the sliding element is not yet displaced towards the sliding surface of the opposite, second part, the snap-in means located on the web can engage the snap-in elements of the adjusting element lying at the front in the direction of actuation. In another embodiment, the snap-in means located on the web can also be positioned in front of the row of snap-in elements of the adjusting element in the direction of actuation of the adjusting element. If the adjusting element is displaced in the direction of actuation, the snap-in elements of the adjusting element, located one behind the other, move over the snap-in means located on the web until the required locking position is reached. Because of the inclined arrangement of the snap-in means of the adjusting element, the projection of the sliding element, which included the web, can move towards the second part simultaneously with the sliding surface of the sliding element. The angle of inclination of the plane in which the snap-in elements of the adjusting element are arranged one behind the other in the direction of actuation, is preferably equal to, or slightly smaller than, the angle of inclination of the second contact surface in relation to the third contact surface of the adjusting element.

According to another embodiment, the row of snap-in elements is arranged along a plane or path that runs parallel to the surface of the first part, or that follows a curvature of the surface of the first part.

To make the interaction of the snap-in means even more elastic, a tongue-like element can be located on the web, on which the snap-in means of the sliding element is provided, which lies opposite the snap-in means of the adjusting element, and is capable of moving elastically away from it.

The web can be connected to the sliding element in both its end areas, in the manner of a bridge, thus ensuring a particularly stable arrangement of the snap-in means of the sliding element above the snap-in means of the adjusting element. In another embodiment, the web can be connected to the sliding element only in one end area.

The web preferably extends perpendicularly to the direction of actuation of the adjusting element.

On the side of the web facing towards the adjusting element, the sliding element can display a recess into which the adjusting element can be inserted. The dimensions of the recess can be such that the side of the adjusting element facing away from the web is located essentially plane-parallel to the sliding surface of the sliding element when the adjusting element is inserted into the recess.

A further advantage of the aforementioned exemplary embodiments can be seen in the special arrangement of the snap-in means, which are provided on the tongue-like element and/or on the projection or the web, since these snap-in means are designed to at least partially retract into the respective recess, meaning that the overall height of the sliding guide can be very small, corresponding to the gap between the first part and the second part. Thus, a very small gap between the tubular parts of a telescopic column can advantageously be selected for design reasons.

In the direction of actuation of the adjusting element, the recess can, on the side of the sliding element facing towards the adjusting element, be followed by the first contact surface, which interacts with the second contact surface of the adjusting element. The first contact surface is preferably located a distance from the snap-in means provided on the web or the tongue-like element in the direction of actuation of the adjusting element. Because of this distance, the recess can extend beyond the area of the web in the direction of actuation of the adjusting element. The surface of the adjusting element plane-parallel to the sliding surface, which follows on from the second contact surface, inclined in relation to it, can be dimensioned in such a way that, when the adjusting element is completely inserted into the recess, it forms an essentially continuous surface with the sliding surface of the sliding element.

In the alternative exemplary embodiment described above, according to which the snap-in means of the adjusting element is provided on a finger-like part that extends at a lateral distance from the part of the adjusting element displaying the second contact surface, the sliding element can likewise display a recess in the area of the web, and preferably beyond, into which the finger-like part can be inserted, in which context the side of the finger-like part opposite to the side displaying the snap-in means, and the other surface areas of the adjusting element provided beyond the second contact surface, lie essentially plan-parallel to the sliding surface of the sliding element.

In a preferred development of the invention, the side of the adjusting element facing away from the snap-in means displays a first supporting surface that is inclined towards the side displaying the snap-in means in the direction of actuation and interacts with a second supporting surface running towards the side displaying the projection in the direction of actuation of the adjusting element, such that, when the adjusting element is displaced in the direction of actuation, the snap-in means of the adjusting element, particularly the previously described row of snap-in elements arranged one behind the other, is guided in the direction of inclination of the two supporting surfaces.

For the purpose of setting the play between the parts moving relative to each other, the adjusting element preferably displays an actuating area, which is located between the first and second part and accessible from the outside, such that the adjusting element can be moved in the direction of actuation, and the second contact surface displaced along the first, by applying pressure to the actuating area with a suitable tool.

If the adjusting element is designed to be displaced transversely relative to the longitudinal direction of the relative movement of the two parts, its end facing in the direction opposite to the direction of actuation can have its actuating area projecting from the sliding element into a gap between the two parts, said actuating area being accessible from a face end of the parts, such that the adjusting element can be displaced in its direction of actuation by actuating a tool that extends into the gap from the face end and acts on the actuating area.

The actuating area can display a run-up surface that is inclined or has a convex curvature in relation to the direction of movement of the two parts in the direction of actuation of the adjusting element, to which pressure can be applied by displacing a tool that can be positioned in the gap between the two parts and operated from outside the two parts.

If the adjusting element is designed to be displaced not transversely, but parallel to the longitudinal direction of the relative movement of the two parts, a face end located on the end of the adjusting element facing away from the second contact surface, to which pressure can be applied in the direction of actuation of the adjusting element from outside the two parts, using a tool where appropriate, can serve as the actuating area of the adjusting element.

As already mentioned above, the invention is particularly designed for a telescopic column with at least two tubular parts that are located one inside the other and can be displaced relative to each other along their sliding surfaces in the longitudinal direction. On telescopic columns of this kind, the first and the second part can display essentially rectangular cross-sections and thus essentially flat opposite sides.

In a preferred embodiment, at least two adjacent sides of the first part are each provided with two sliding bearings, spaced apart from each other in the transverse direction and in a mirror-inverted arrangement relative to the perpendicular center plane of the corresponding side running in the longitudinal direction, for setting the play in the corresponding directions perpendicular to each other. In special cases, however, it is also possible to provide one or more sliding bearings on just one side of the first part.

In particular, the sliding bearing can be located on the inner tubular part. The advantage in this case is that any scratches caused by the sliding bearing occur on the inside of the outer tubular part, meaning that there is no resultant optical impairment of the telescopic column.

The sliding bearing is preferably located in an end area of the first tubular part. Moreover, in the case of two tubular parts located one inside the other, it can be expedient to provide both the inner part (as the first part, the outer part forming the second part) and the outer part (as the first part, the inner part forming the second part) with one or more sliding bearings, as described above, in the end areas of the parts overlapping during the relative movement.

To provide sliding guidance over a larger section of the sliding element in the longitudinal direction of the relative movement of the two parts, the sliding element of each sliding bearing can display two first contact surfaces that are spaced apart from each other in the longitudinal direction of the telescopic column and inclined towards the corresponding side in the transverse direction, each of which interacts with a second contact surface of an adjusting element that can be displaced in the transverse direction. In this embodiment, the sliding element is preferably of strip-like design and arranged in the longitudinal direction of the telescopic column. In particular, the end areas of the strip-like sliding element can be designed in a suitable manner, as described above, in order to accommodate the two adjusting elements. The detailed design of the corresponding areas and the adjusting elements can be as described above on the basis of exemplary embodiments.

Preferably, two sliding bearings are located opposite each other in the two lateral edge areas of the corresponding flat side of the first tubular part, each having a strip-like sliding element of the kind described above. The two sliding bearings are expediently oriented in such a way that the adjusting elements with opposite directions of actuation are opposite each other.

The sliding bearings are preferably designed in mirror-inverted fashion in relation to their center plane running perpendicularly to their longitudinal direction, such that identical sliding bearings can be used on the right and left on the flat side of the tubular part in question, rotated through 180° relative to each other.

To permit simple arrangement of sliding bearings across the corners on adjacent sides of the tubular part, two sliding bearings of the kind described above can be joined to each other via connections on their sides opposite the adjusting elements, and positioned at right angles to each other.

As described above, the adjusting elements that can be displaced transversely to the longitudinal direction of the strip-like sliding elements can display projecting actuating areas with run-up surfaces that are inclined or have a convex curvature in the direction of actuation, such that pressure can be applied to them by displacing a tool that can be positioned in the interior space between the two tubular parts and operated from outside the two parts. The tool preferably displays a wider area that can be positioned between the adjusting elements spaced apart in the longitudinal direction, where the end areas forming the wider area display inclined or convexly curved run-up surfaces that interact with the run-up surfaces on the sides of the actuating areas of the adjusting elements facing each other in the event of longitudinal displacement of the tool in both directions. In this context, the area of the tool extending into the gap between the two tubular parts, particularly the wider area, has a thickness corresponding to the thickness of the sliding element at most. By displacing the tool towards the opposite end of the first tubular part, the run-up surface of the tool pointing in this direction applies pressure to the run-up surface of the adjusting element lying in this direction, while the run-up surface of the tool pointing in the backward direction applies pressure to the run-up surface of the adjusting element lying in the backward direction in the event of backward displacement of the tool. By moving the tool back and forth in the gap between the two sliding bearings and the overlapping tubular parts, the play can be individually set in the two separated longitudinal sections of the sliding guide in which the adjusting elements are located. Based on simultaneous or subsequent relative movement of the two tubular parts, it can be checked whether optimum compensation for play has been achieved or not. In the latter case, the tool is used to apply further pressure in the direction of actuation to the adjusting element, or the two opposite adjusting elements, in the corresponding longitudinal section, thereby reducing the play between the sliding element and the opposite sliding surface of the second tubular part.

In another preferred development of the invention with adjusting elements that can be displaced in the longitudinal direction of the relative movement of the two parts, it is envisaged that at least two adjacent sides of the first part are each provided with a sliding bearing, the sliding element of which displays two areas, connected to each other and spaced apart in the longitudinal direction of the telescopic column, where each area displays first contact surfaces that are spaced apart in the transverse direction, inclined towards the corresponding side in the longitudinal direction of the telescopic column, and interact with the second contact surfaces of an adjusting element that can be displaced in the longitudinal direction of the telescopic column.

In this context, the adjusting element can display a first area interacting with one of the areas of the sliding element, on the one face end of which the actuating area is provided, and a second area interacting with the other area of the sliding element, which is connected to the first area by a bridge part, in which context the bridge part extends between the two first contact surfaces of the sliding element adjacent to the first area of the adjusting element.

In special cases, a sliding bearing of this kind can also be provided on only one of the sides of the first part.

The width of a sliding bearing of this kind can correspond roughly to the width of the side in question.

As a result of the two pairs of interacting contact surfaces between the sliding element and the adjusting element, arranged a distance apart from each other in the longitudinal direction of the telescopic column, optimum, symmetrical sliding guidance between the sliding element and the tubular part sliding on it is ensured, extending over the corresponding longitudinal area. Application of pressure to the face end of the adjusting element serving as the actuating area achieves simultaneous setting of the play in the area of the at least four interacting contact surfaces of the sliding element and the adjusting element.

In a preferred development of the invention, it is envisaged that the sliding bearing be of one-piece design, at least in its as-manufactured condition and in its installed condition prior to setting of the play, where the sliding element and the adjusting element are joined to each other via connections. In the condition mentioned, the first and the second area of the adjusting element are located a distance apart from the two areas of the sliding element respectively interacting with them in the longitudinal direction of the telescopic column. The arrangement is such that, when the adjusting element is displaced in the longitudinal direction of the telescopic column relative to the sliding element by applying pressure to the actuating area, the connections break or are stretched in such a way that the second contact surfaces of the first and second area of the adjusting element can be slid onto the first contact surfaces in the two areas of the sliding element.

This preferred embodiment has the advantage that only one component has to be handled when installing the sliding bearing. The sliding element and the adjusting element are captively connected to each other after being manufactured. For installation in the telescopic column, the tubular parts accommodating the sliding bearing are moved apart, such that the sliding bearing can be positioned on the corresponding first part, in which context the projections of the sliding element engage the recesses provided in the first tubular part. After installation, the second tubular part is moved over the sliding element on the first tubular part and brought into a position where the actuating area of the adjusting element projects outwards between the two parts or, according to another embodiment, is located in an inwardly offset position. By applying pressure to the actuating area in the direction of actuation of the adjusting element using a suitable tool, the second contact surfaces are moved towards the first contact surfaces of the sliding element opposite them, in which context the connections break or are correspondingly stretched until the required compensation for play is achieved.

The interacting areas of the sliding element and the adjusting element can be designed in the manner described above for the adjusting elements that can be displaced in the longitudinal direction of the relative movement of the parts.

The adjusting element and the sliding element can, apart from the projections, be designed essentially as flat, plate-like components, where at least the opposite, larger side surfaces are arranged in coplanar fashion in the as-manufactured condition and in the installed condition prior to setting of the play.

In a development of the above embodiments, the first part and/or the second part can have different cross-sectional shapes and be designed as a tube and/or a rod. In this context, the second sliding surface, for example, can be of plane, curved, convex, fluted or similar design, in which context the design of both the sliding bearing and the adjusting element, including the contact surfaces, is adapted to the shape of at least the second sliding surface. Thus, according to one embodiment, at least one of the parts, i.e. the first part and/or the second part, can, for example, consist of a round or oval tube, where at least the first sliding surface corresponds to the bend or convexity of the second sliding surface. The above-mentioned sliding bearings and adjusting elements are advantageously of very thin design, such that they can be positioned, either by reshaping or by primary forming, in a gap having the form of an arc that extends between a first part and a second part of the telescopic column, in which context at least the first or the second part displays an arc-shaped or curved second sliding surface, at least in some areas.

Exemplary embodiments of the invention are described in more detail below on the basis of the drawing.

Figures 2, 3:
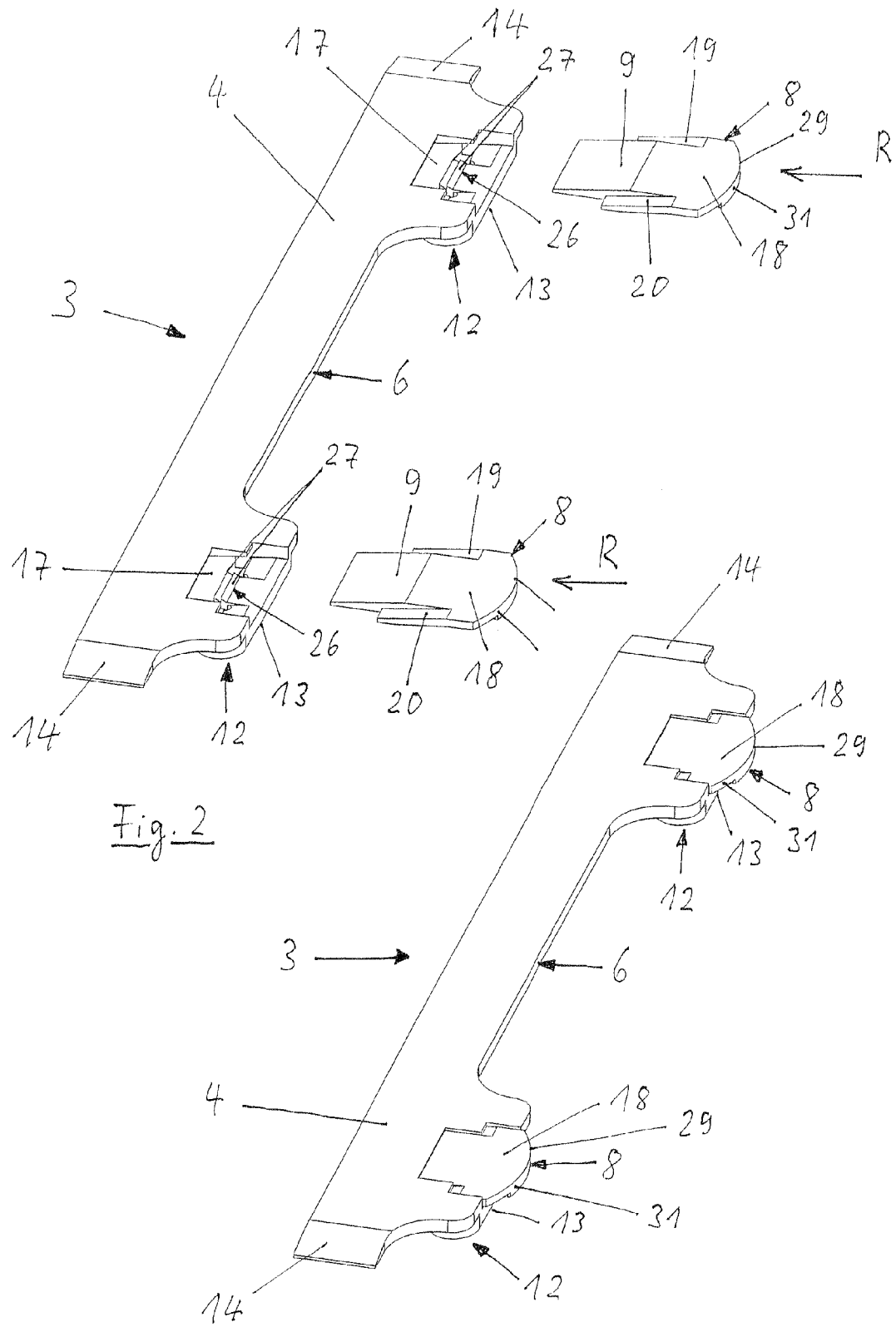

The Figures show the following:

FIG. 1 A section of a telescopic column with sliding bearings located on the inner tubular part, FIG. 2 A perspective, exploded view of a sliding bearing shown in FIG. 1, FIG. 3 A perspective view of the sliding bearing with adjusting elements completely inserted into the sliding element, FIG. 4 A perspective view of the sliding bearing shown in FIG. 3, from below, FIG. 5 A perspective, exploded view of the sliding bearing shown in FIG. 4, FIG. 6 A cross-sectional view of the sliding bearing located between the inner and outer tubular part of the telescopic column, with the adjusting element in its initial actuating position, FIG. 7 A cross-sectional view according to FIG. 6, with the adjusting element in its final actuating position, where the play between the sliding bearing and the outer tubular part is compensated for, FIG. 8 A perspective view of two sliding bearings connected to each other across the corner, FIG. 9 A cutaway view of a section of the telescopic column, with inserted tool actuating the rear adjusting elements, FIG. 10 A cutaway view of a section of the telescopic column, with inserted tool actuating the front adjusting elements, FIG. 11 A perspective, exploded view of a further exemplary embodiment of a telescopic column with four sliding bearings, FIG. 12 A perspective view of one of the sliding bearings shown in FIG. 11, FIG. 13 A perspective view of the adjusting element of the sliding bearing shown in FIG. 12, FIG. 14 A perspective view of the sliding element of the sliding bearing shown in FIG. 12, FIG. 15 A cutaway view of the telescopic column according to FIG. 11, revealing a sliding bearing in as-manufactured condition, FIG. 15*a* An enlarged view of area A in FIG. 15, FIG. 16 A cutaway view according to FIG. 15, where the connections between the adjusting element and the sliding element have been broken following first-time movement of the adjusting element in the direction of actuation, FIG. 16*a* An enlarged view of area B in FIG. 16, FIG. 17 A cutaway view according to FIG. 15, where the snap-in means of the sliding element engages the front snap-in elements of the adjusting element, FIG. 17*a* An enlarged view of area C in FIG. 17, FIG. 18 A cutaway view according to FIG. 15, where the snap-in means of the sliding element engages the rear snap-in elements of the adjusting element, and FIG. 18*a* An enlarged view of area D in FIG. 18.

The embodiment illustrated in FIGS. 1-10 is a telescopic column with at least two tubular parts 1 and 2, located one inside the other, where sliding bearings 3, each having a first sliding surface 4, are located on inner, first part 1, lying opposite second sliding surfaces 5, provided on outer, second part 2.

A mechanical drive unit can be inserted in at least one of parts 1 and 2, where said drive unit can make use of threaded spindles, traction means, a combination of threaded spindles and traction means, various reversing gears, such as worm gears, planetary gears, bevel gears, lantern gears similar to bevel gears, or combinations thereof. An electric motor can serve as the drive, and can be directly integrated in the telescopic column, or fitted directly to the outside of the telescopic column as a geared motor, or located a distance away from the telescopic column.

As can particularly be seen from FIGS. 2-5, each sliding bearing 3 comprises a sliding element 6, on which first sliding surface 4 is formed and on the side of which facing away from first sliding surface 4 two first contact surfaces 7 are provided, located a distance apart from each other.

Each sliding bearing 3 furthermore comprises two adjusting elements 8, each of which has a second contact surface 9 that can be brought into contact on the associated first contact surface 7 by displacement in a direction of actuation R. In this context, they are supported on first tubular part 1 by a third contact surface 10, facing away from the respective second contact surface 9, such that sliding element 6 with first sliding surface 4 can be moved towards second sliding surface 5 of second part 2 by further displacing adjusting element 8 in its direction of actuation R.

As shown in FIG. 1, first part 1 displays, outside its area in which the respective adjusting element 8 is supported on its third contact surface 10, a recess 11, in which a projection 12, located on sliding element 6, is mounted in positive fashion in direction of actuation R of the displacement of adjusting element 8. As explained in more detail below on the basis of FIGS. 6 and 7, projection 12 is mounted in recess 11 in a manner permitting displacement towards outer, second tubular part 2.

The sliding elements are made of a plastic having high surface slip, and designed as relatively thin plates, where first sliding surface 4 is provided on one of their larger side surfaces, and two projections 12 on their opposite, other larger side surface. The adjusting elements are likewise designed as relatively thin plates, the thickness of which corresponds roughly to the thickness of the plate-like areas of the sliding element. The height of projections 12, located on the side of sliding element 6 facing away from sliding surface 4, corresponds roughly to the depth of recesses 11 on the outer side of inner, first part 1. Recesses 11 are designed as through-holes in the form of slots in first part 1, extending in the longitudinal direction of the telescopic column.

On their ends lying in the direction of movement of the two parts 1 and 2, the sliding elements display run-up surfaces 14 for unimpeded running-up of part 2 onto sliding bearing 3, located on part 1.

In the first embodiment, shown in FIGS. 1-10, first contact surfaces 7 and second contact surfaces 9 are inclined relative to a plane located perpendicularly to the longitudinal direction of the relative movement of the two parts 1 and 2, and parallel to sliding surfaces 4 and 6, such that adjusting elements 8 can be moved transversely to the longitudinal direction of the telescopic column in order to set a play between the two sliding surfaces 4 and 5.

As can particularly be seen from FIGS. 2-5, adjusting elements 8 are guided on sliding element 6 in their direction of actuation. The design of projections 12, located on sliding element 6, is such that they have a web 13 reaching over adjusting element 8. The two end areas 15 and 16 of webs 13 are connected to sliding element 6 in the manner of a bridge. Webs 13 extend perpendicularly to the direction of actuation of adjusting elements 8.

Furthermore, sliding element 6 displays a recess 17, on the side of webs 14 facing towards the respective adjusting element 8, into which the respective adjusting element 8 can be inserted. Recess 17 is dimensioned in such a way that surface 18 of adjusting element 8 facing away from web 13 is located in a plane-parallel position relative to sliding surface 4 of sliding element 6 when inserting adjusting element 8 into recess 17, before force is exerted on the corresponding first contact surface 7 of sliding element 6. As a result, the height of sliding bearing 3 in the gap between inner, first part 1 and outer, second part 2 of the telescopic column is extremely small. It can be between 1 mm and 2 mm, while the distance between parts 1 and 2 in the area of sliding bearing 3 is of slightly larger dimensions. For example, the height of sliding bearing 3 can be 1.3 mm, and the distance between the two parts 1 and 2 1.5 mm.

In the direction of actuation of adjusting element 8, the respective first contact surface 7 follows on from recess 17 on the side of sliding element 6 facing towards adjusting element 8. As can particularly be seen from FIGS. 6 and 7, first contact surface 7 is located a distance away from web 13 in direction of actuation R of adjusting element 8. Because of this distance, recess 17 extends beyond the area of web 13 in direction of actuation R of adjusting element 8. Surface 18 of adjusting element 8, which is plane-parallel to sliding surface 4 of sliding element 6 and follows on from second contact surface 9, inclined relative to it, is dimensioned in such a way that, when adjusting element 8 is completely inserted into recess 17, it forms an essentially closed surface together with sliding surface 4 of sliding element 6.

As can particularly be seen from FIGS. 2-5, the two sides of adjusting elements 8 display first supporting surfaces 19 and 20, which are inclined towards the respective web 13 in the direction of actuation and interact with second supporting surfaces 21 and 22, which are inclined towards the side of sliding element 6 displaying web 13 in the direction of actuation of adjusting element 8. Thus, when adjusting element is displaced in direction of actuation R, its side 23, in particular, facing away from second contact surface 9 and surface 18, is guided parallel to sliding surface 4 of sliding element 6.

Figure 6:
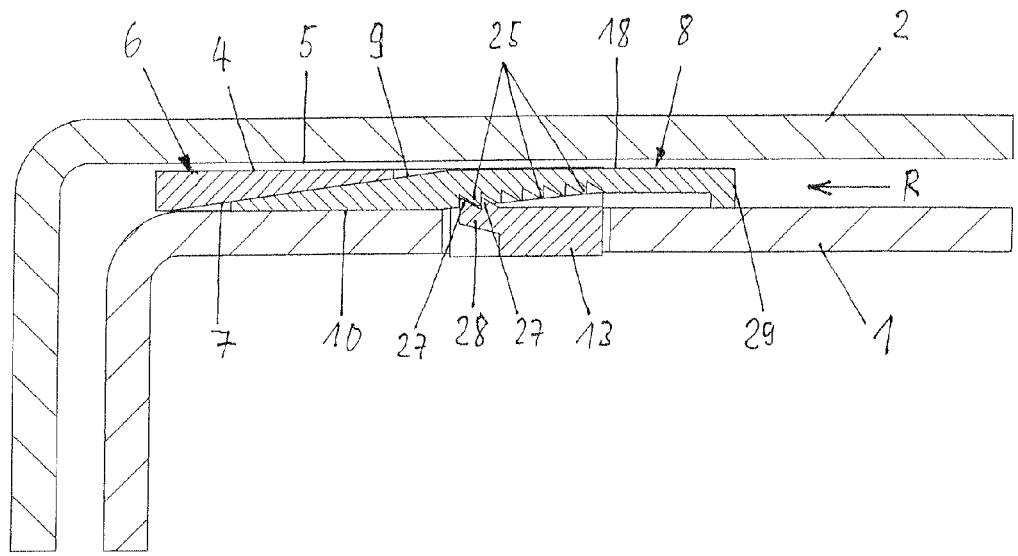
Figure 7:
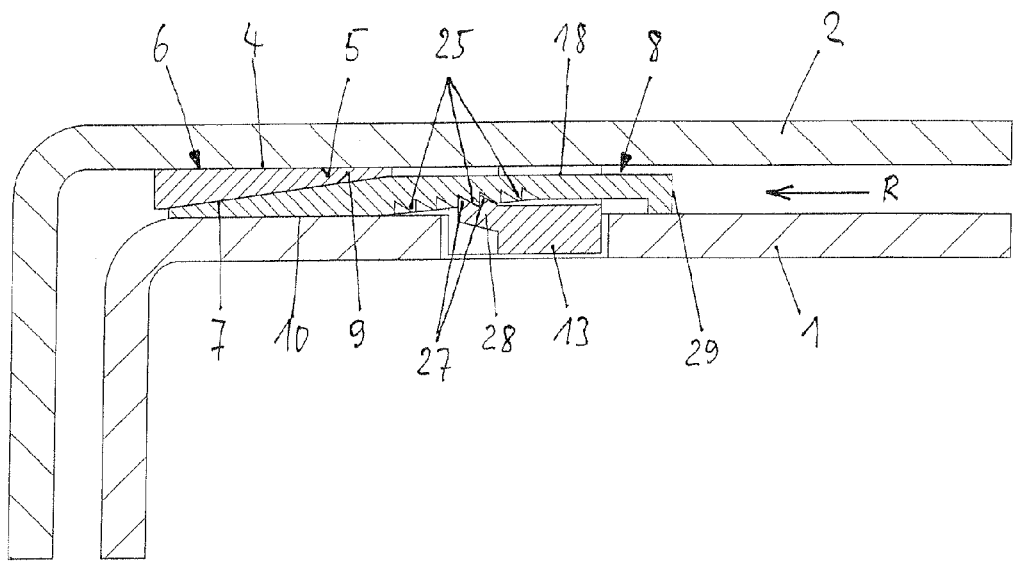

As shown in FIGS. 4-7, side 23 of adjusting element 8 is provided with snap-in means 24, comprising a row of teeth 25, arranged at a distance from each other in the direction of actuation of adjusting element 8, and extending transversely to the direction of actuation. Snap-in means 24, located on adjusting element 8, interacts with snap-in means 26, located on the side of web 14 facing towards recess 17. Snap-in means 26 comprises two teeth 27, as shown in FIGS. 2, 6 and 7.

As can likewise be seen from FIGS. 6 and 7, the row of teeth 25 of snap-in means 24, located on adjusting element 8, is located in a plane that, relative to third contact surface 11, by means of which adjusting element 8 is supported on first part 1, is inclined towards third contact surface 10 in direction of actuation R. In the initial actuating position of adjusting element 8 shown in FIG. 6, where second contact surface 9 lies on first contact surface 7 of the sliding element, but without transmitting an effective force to it, snap-in means 26, located on web 13, engages teeth 25 of adjusting element 8 lying at the front in direction of actuation R. If adjusting element 8 is displaced in direction of actuation R, teeth 25 of adjusting element 8, which are located one behind the other, move over snap-in means 26, located on web 13, until they reach a locking position shown in FIG. 7, where the play originally present between sliding surface 4 of sliding element 6 and outer, second tubular part 2 of the telescopic column is compensated for. Because of the inclined arrangement of teeth 25 of adjusting element 8, projection 12 of sliding element 6, which includes web 13, can simultaneously move towards outer, second tubular part 2, together with sliding surface 4 of sliding element 6. The angle of inclination of the plane in which teeth 25 of adjusting element 8 are arranged one behind the other in direction of actuation R is somewhat smaller than the angle of inclination of second contact surface 9 relative to third contact surface 10 of adjusting element 8.

To make the interaction of snap-in means 24 and 26 even more elastic, web 13 displays a tongue-like element 28, on which snap-in means 26 of sliding element 6 is provided, and which can move elastically away from snap-in means 24 of adjusting element 8.

In a manner not presented in detail, and according to another embodiment, web 13 can display snap-in means 24 and 26.

For the purpose of setting the play between sliding bearing 3 and outer, second tubular part 2, adjusting element 8 displays an actuating area 29, which is located between the two tubular parts 1 and 2, and is accessible from the outside in such a way that adjusting element 8 can be moved in direction of actuation R, and second contact surface 9 displaced along first contact surface 7, by applying pressure to actuating area 29 by means of a suitable tool 30. As shown in FIGS. 3 and 4, in particular, actuating area 29 projects from sliding element 6 on the end of adjusting element 8 facing in the opposite direction to direction of actuation R, in the gap between the two parts 1 and 2, such that it is accessible from the face end of inner, first part 1. Adjusting element 8 can be displaced in its direction of actuation R by actuating a tool 30, extending into the gap at the face end and acting on actuating area 29.

As can be seen from FIGS. 2-5, actuating area 29 displays a slightly convex run-up surface 31, to which pressure can be applied by displacing a tool 30 that can be positioned in the gap between the two parts 1 and 2, and operated from outside the two parts 1 and 2.

As FIGS. 1, 6 and 7 show, inner, first tubular part 1, and outer, second tubular part 2 of the telescopic column display essentially rectangular cross-sections, and thus essentially flat opposite sides. At least two adjacent sides of inner, first part 1 are each provided with two sliding bearings 3, spaced apart from each other in the transverse direction and in a mirror-inverted arrangement relative to the perpendicular center plane of the corresponding side running in the longitudinal direction, for setting the play in directions perpendicular to the sides in question. As can particularly be seen from FIG. 1, sliding bearings 3 are located in an end area of inner, first tubular part 1 in such a way that the two sliding bearings 3 are opposite each other in the two lateral edge areas of the flat side in question. Sliding bearings 3 are designed in mirror-inverted fashion in relation to their center plane running perpendicularly to the longitudinal direction, such that identical sliding bearings 3, rotated through 180° relative to each other, can be used on the right and left on the corresponding flat side of the inner, first tubular part.

Figure 8:
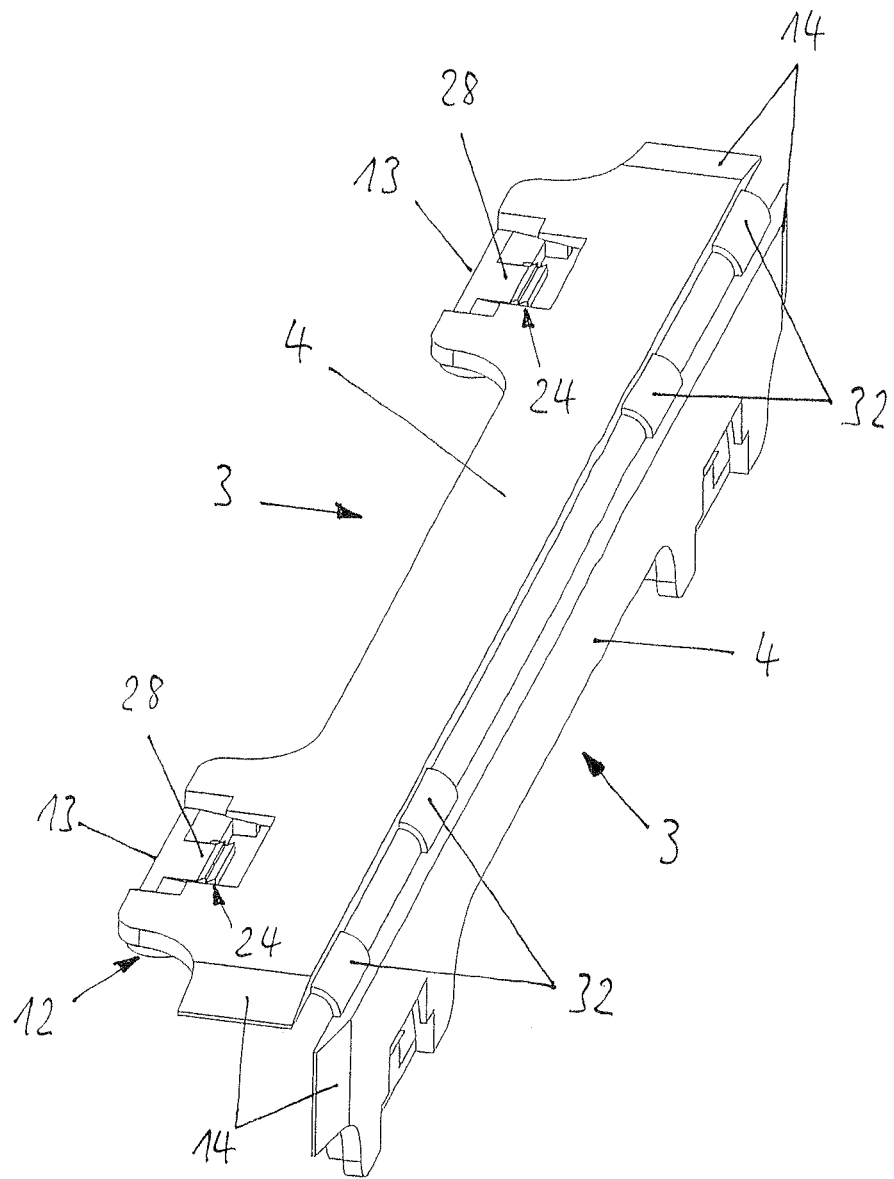

To permit simple arrangement of sliding bearings 3 across the corner on adjacent sides of the inner, first tubular part, two sliding bearings 3 can be joined to each other via connections 32 on their sides opposite adjusting elements 8, and positioned at right angles to each other, as shown in FIG. 8.

As can be seen from FIGS. 9 and 10, tool 30 displays a wider area 33, for actuating adjusting elements 8, that can be positioned between adjusting elements 8 spaced apart in the longitudinal direction, where the end areas forming the wider area display inclined run-up surfaces 34 and 35 that interact with run-up surfaces 31 on the sides of actuating areas 29 of adjusting elements 8 facing each other in the event of longitudinal displacement of tool 30 in both directions. In this context, the area of tool 30 extending into the gap between the two tubular parts 1 and 2, particularly wider area 33, has a thickness roughly corresponding to the thickness of sliding elements 6 and adjusting elements 8. By displacing tool 30 towards the opposite end of inner, first tubular part 1, run-up surfaces 34 of tool 30 pointing in this direction apply pressure to run-up surfaces 31 of adjusting elements 8 lying in this direction. In the event of backward displacement of tool 30, run-up surfaces 35 of tool 30 pointing in the backward direction can apply pressure to run-up surfaces 31 of adjusting elements 8 lying in this direction.

To insert tool 30 in the gap between adjusting elements 8, outer, second tubular part 2 of the telescopic column is displaced over sliding bearings 3, located on first part 1, to such an extent that they are exposed, as shown in FIG. 1. Tool 30 can then be inserted from the outside between sliding bearings 3 located on one side of first part 1. Outer, second part 2 is then displaced over sliding bearings 3 into a position like that shown in FIGS. 9 and 10, such that second part 2 overlaps the sliding bearings. By moving tool 30 back and forth in the gap between the two sliding bearings 30 and overlapping parts 1 and 2, the play can be individually set between the separated longitudinal sections of sliding element 6, displaying adjusting elements 8, and the opposite sliding surfaces 5 of outer, second part 2. Based on simultaneous or subsequent relative movement of the two parts 1 and 2, it can be checked whether optimum compensation for play has been achieved or not. In the latter case, tool 30 is used to apply further pressure in the direction of actuation to the two opposite adjusting elements 8 in the corresponding longitudinal section of sliding bearings 3, thereby reducing the play between sliding element 6 and opposite sliding surface 5 of outer, second part 2.

Figure 12:
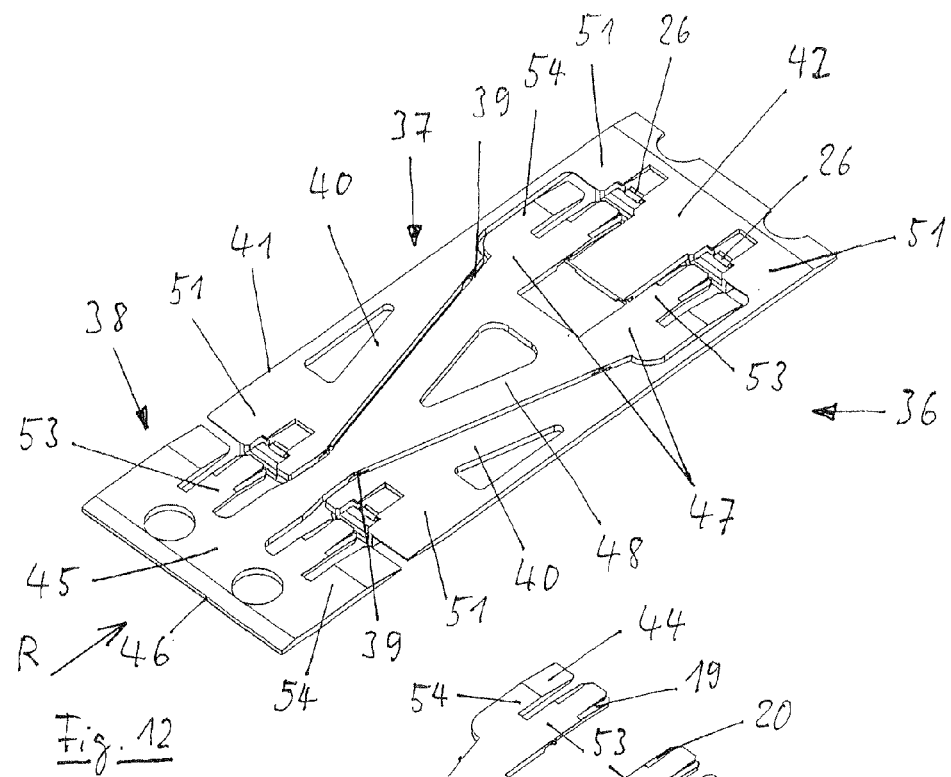
Figure 13:
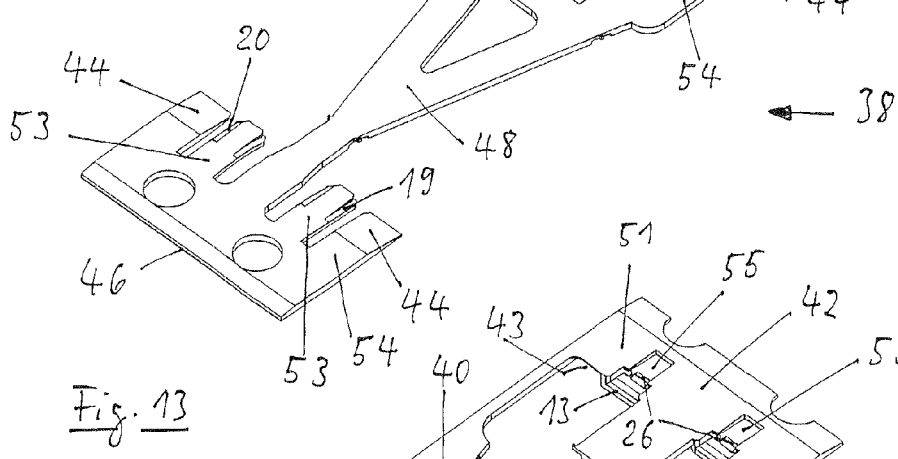
Figure 14:
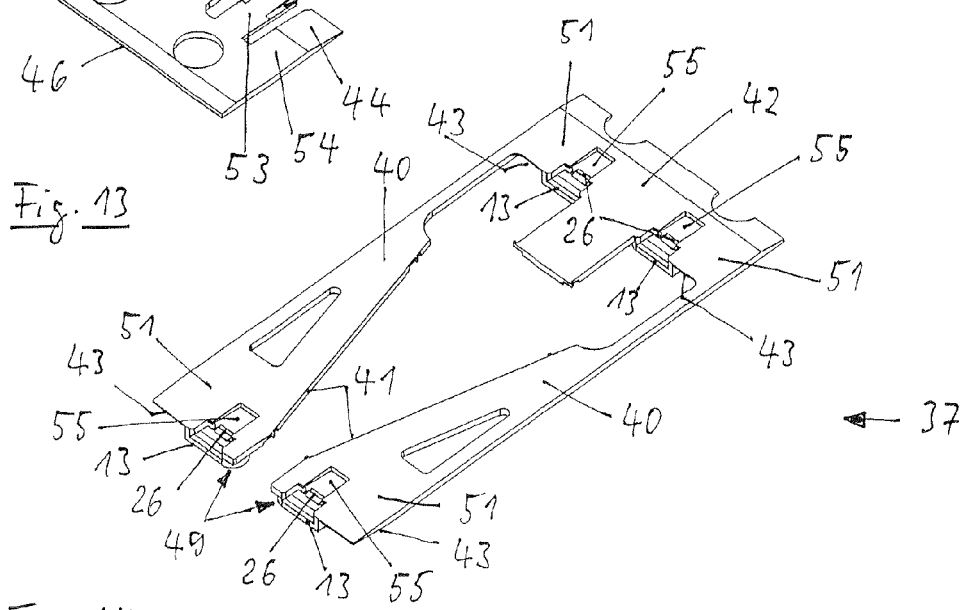

The embodiment illustrated in FIGS. 11-18*a* has, as can particularly be seen from FIG. 11, four sliding bearings 36, located on the outer sides of inner, first part 1 of a telescopic column. As show more exactly in FIGS. 12-14, each sliding bearing 36 consists of a continuous sliding element 37 and an continuous adjusting element 38 interacting with it. In as-manufactured condition and installed condition of sliding bearing 36 prior to setting of the play, as illustrated in FIGS. 11 and 12, sliding element 37 and adjusting element 38 are joined to each other in one piece via connections 39.

Sliding element 37 displays two areas 41 and 42 that are connected to each other via lateral webs 40 and spaced apart from each other in the longitudinal direction of the telescopic column, where each area 41, 42 displays first contact surfaces 43 that are spaced apart from each other transversely to the longitudinal direction of the telescopic column and inclined towards the corresponding side of first part 1 in the longitudinal direction of the telescopic column. First contact surfaces 43 of sliding element 37 interact with second contact surfaces 44 of adjusting element 38, which can be displaced in the longitudinal direction of the telescopic column.

To this end, adjusting element 38 displays a first area 45, interacting with area 41, the one face end of which is provided with an actuating area 46 for adjusting element 38, and a second area 47, interacting with the other area 42 of sliding element 37, which is connected to first area 45 via a bridge part 48. Bridge part 48 extends between the two lateral webs 40 connecting areas 41 and 42 of sliding element 37.

In as-manufactured condition and installed condition of sliding bearing 36 prior to setting of the play, as illustrated in FIGS. 11 and 12, first and second areas 45, 47 of adjusting element 38 are spaced apart from the two areas 41 and 42 of sliding element 37, respectively interacting with them, in the longitudinal direction of the telescopic column. The arrangement is such that, when adjusting element 38 is displaced in the longitudinal direction of the telescopic column relative to sliding element 37, connections 39 between bridge part 48 and webs 40 break, such that second contact surfaces 44 of first and second areas 45, 47 of adjusting element 38 can be slid onto first contact surfaces 43 in the two areas 41, 42 of sliding element 37.

Sliding elements 37 and adjusting elements 38 are made of a plastic with high surface slip and designed as relatively thin plates that can be positioned in a narrow gap between inner, first tubular part 1 and outer, second tubular part 2 of the telescopic column. The opposite, larger side surfaces of a sliding element 37, and of adjusting element 38 joined to it via connections 39 in the as-manufactured and installed condition, are arranged in coplanar fashion relative to each other. Sliding bearings 36 have the form of an essentially rectangular plate, whose opposite, narrow side surfaces extending in the longitudinal direction of the telescopic column display a greater length than the narrow side surfaces lying opposite each other in the transverse direction. The length of the latter narrow side surfaces corresponds roughly to the width of the side of inner, first part 1 associated with the respective sliding bearing 36. Sliding bearings 36 are located in an end section of first part 1 that is overlapped by second part 2 over the entire path of the movement of the two parts 1 and 2 relative to each other.

The side of sliding elements 37 facing towards first part 1 in each case displays four projections 49, which are mounted in positive fashion in recesses 50 on the corresponding side of first part 1 in direction of actuation R of the displacement of adjusting element 38, i.e. in the longitudinal direction of the telescopic column. As in the first embodiment described above, projections 49 are mounted in recesses 50 in a manner permitting displacement towards outer, second tubular part 2. When adjusting element 38 is actuated, they can, as in the first embodiment, thus move, together with first sliding surface 51 of sliding element 37, towards opposite, second sliding surface 52 on outer, second part 2, without causing stresses in sliding element 37.

As in the first embodiment described above, interacting snap-in means 24 and 26 are provided on sliding element 37 and adjusting element 38, permitting stepwise setting of the play and preventing backward movement of adjusting element 38 in the direction opposite to its direction of actuation R. Like those in the first embodiment, snap-in means 24 and 26 are designed in the form of teeth 25 and 27.

Snap-in means 26 of sliding element 37 are in each case located on a web 13, which forms a projection 49, lying opposite snap-in means 24 of adjusting element 38. Regarding the details, reference is made to the corresponding description of the first embodiment.

In contrast to the first embodiment, snap-in means 24 of adjusting element 38 is provided on a finger-like part 53 of adjusting element 38 that extends a lateral distance away from a part 54 of adjusting element 38 displaying the associated second contact surface 44. For guiding finger-like parts 53 in sliding element 37, recesses 55 are provided in the area of webs 13, and beyond in direction of actuation R of adjusting element 38. Provided on the side of adjusting element 38 above it that faces away from snap-in means 24 are first supporting surfaces 19, 20 that are each inclined towards the side of snap-in means 24 and interact with second supporting surfaces 21, 22, each of which is inclined towards the respective web 13, such that snap-in means 24 are guided in the direction of inclination of the supporting surfaces when adjusting element 38 is displaced in the direction of actuation.

Parts 54 of adjusting element 38, displaying second contact surface 44, are expediently located outside finger-like parts 53. As a result, when adjusting element 38 is displaced in direction of actuation R, sliding element 37 is pressed towards second part 2 on laterally outward-lying areas that are spaced apart in the longitudinal direction.

For installation in the telescopic column, tubular parts 1 and 2 accommodating sliding bearings 36 are moved apart, such that sliding bearings 36 can, as already described above, be located on an end section of inner, first part 1, in which context projections 49 of sliding elements 37 engage recesses 50, provided in first part 1. Following installation, second tubular part 2 is moved relative to first tubular part 1, over sliding bearings 36, as shown in FIGS. 15 and 15a, for example. Sliding element 37 and adjusting element 38 continue to be joined to each other via connections 39.

By applying pressure to the face end of adjusting element 38, serving as actuating area 46, by means of a suitable tool inserted into the gap between the two parts 1 and 2 at the face end, second contact surfaces 44 of adjusting element 38 are moved towards first contact surfaces 43 of sliding element 37, connections 39 thus being broken. This position of adjusting element 38 relative to sliding element 37 is shown in FIGS. 16 and 16a.

When adjusting element 38 is moved farther in direction of actuation R by the tool, a first locking position of snap-in means 24, located on adjusting element 38, and of snap-in means 26, provided on sliding element 37, is reached at the same time. Adjusting element 38 and sliding element 37 are designed in such a way that, in the initial, first locking position of their snap-in means 24 and 26, compensation for the play between first sliding surface 51 of sliding element 37 and second sliding surface 52, lying opposite it on the inside of outer, second part 2, is usually not yet achieved. A position of this kind is shown in FIGS. 17 and 17a.

To compensate for the play, adjusting element 38 is moved farther in direction of actuation R by means of the tool, in which context the teeth of snap-in means 24 of adjusting element 38 slide over the teeth of snap-in means 26 on webs 13 of sliding element 37, until at least provisional compensation for the play is achieved in an advanced locking position of the two snap-in means 24 and 26. A position of this kind between adjusting element 38 and sliding element 37 is shown in FIGS. 18 and 18a.

Relative movement of the two parts 1 and 2 can be used to check whether or not optimum compensation for the play has been achieved by means of the procedure described above. If not, further pressure can be applied to actuating area 46 in order to press second contact surfaces 44 of adjusting element 38 against first contact surfaces 43 of sliding element 37, until a more advanced locking position between snap-in means 24 and 26 is reached, by means of which optimum compensation for the play is achieved.

List of Reference Numbers

1 First part
2 Second part
3 Sliding bearing
4 First sliding surface
5 Second sliding surface
6 Sliding element
7 First contact surface
8 Adjusting element
9 Second contact surface
10 Third contact surface
11 Recess
12 Projection
13 Web
14 Run-up surface
15 End area
16 End area
17 Recess
18 Surface
19 First supporting surface
20 First supporting surface
21 Second supporting surface
22 Second supporting surface
23 Side
24 Snap-in means
25 Tooth
26 Snap-in means
27 Tooth
28 Tongue-like element
29 Actuating area
30 Tool
31 Run-up surface
32 Connection 33 Wider area
34 Run-up surface
35 Run-up surface
36 Sliding bearing
37 Sliding element
38 Adjusting element
39 Connection
40 Web
41 Area
42 Area
43 First contact surface
44 Second contact surface
45 First area
46 Actuating area
47 Second area
48 Bridge part
49 Projection
50 Recess
51 First sliding surface
52 Second sliding surface
53 Finger-like part
54 Part
55 Recess
R Direction of actuation

The invention claimed is:

1. Device with at least two parts movable relative to each other along sliding surfaces, comprising:
a sliding bearing with a first sliding surface located on at least one first part, said first sliding surface lying opposite a second sliding surface provided on a second part, the sliding bearing comprises a sliding element on which the first sliding surface is formed, and on the side of which facing away from the first sliding surface a first contact surface, inclined relative to the first sliding surface, is provided, and an adjusting element having a second contact surface that lies on the first contact surface in a manner permitting displacement in a direction of actuation and, in this context, is supported on the first part by a third contact surface, facing away from the second contact surface, such that, by displacing the adjusting element in its direction of actuation, the sliding element with the first sliding surface can be moved towards the second sliding surface of the second part, characterized in that the first part displays a recess, located outside the area in which the adjusting element is supported on the first part by the third contact surface, in which a projection located on the sliding element is mounted in positive fashion in the direction of actuation of the displacement of the adjusting element;
wherein the first part is an inner tubular part and the second part is an outer tubular part; and
wherein interlocking snap-in means are provided on the sliding element and the adjusting element permitting stepwise setting of play between the sliding element and the adjusting element.

2. Device according to claim 1, characterized in that the projection is mounted in the recess in a manner permitting displacement towards the second part.

3. Device according to claim 1, characterized in that the sliding element is formed as a plate, where the first sliding surface is located on one of its larger side surfaces, the projection being located on its opposite, other larger side surface.

4. Device according to claim 1, characterized in that the sliding element (6) comprises multiple first contact surfaces (7) and associated adjusting elements (8).

5. Device according to claim 1, characterized in that the sliding element comprises multiple first contact surfaces, and the adjusting element comprises multiple associated second contact surfaces.

6. Device according to claim 1, characterized in that the first contact surface and the second contact surface are inclined in relation to the longitudinal direction of the relative displacement of the two parts.

7. Device according to claim 1, characterized in that the first contact surface (7) and the second contact surface (9) are inclined in relation to a plane lying perpendicularly to the longitudinal direction of the relative displacement of the two parts (1, 2) and parallel to the sliding surfaces (4, 5).

8. Device according to claim 1, characterized in that the adjusting element is guided on or in the sliding element in its direction of actuation.

9. Device according to claim 8, characterized in that the adjusting element is guided on or in the sliding element in such a way that movement opposite to the direction of actuation is inhibited or blocked by a resistance.

10. Device according to claim 9, characterized in that the resistance is generated by the interacting snap-in means.

11. Device according to claim 10, characterized in that the projection located on the sliding element reaches over the adjusting element in the area of the snap-in means of the adjusting element by means of a web on which the snap-in means of the sliding element is located.

12. Device according to claim 11, characterized in that the web displays a tongue-like element, on which the snap-in means of the sliding element is provided, which lies opposite the snap-in means of the adjusting element, and can be moved elastically away from it.

13. Device according to claim 11, characterized in that, on the side facing away from the snap-in means, the adjusting element.

14. Device according to Claim 1, characterized in that the snap-in means are designed as teeth.

15. Device according to Claim 1, characterized in that the snap-in means provided on the adjusting element is provided in an area of the side of the adjusting element facing away from the second contact surface.

16. Device according to claim 15, characterized in that, seen in the direction of actuation (R) of the adjusting element (8), the snap-in means (24) located on the adjusting element (8) is provided in an area of the adjusting element (8) opposite the second contact surface (9).

17. Device according to claim 15, characterized in that, seen in the direction of actuation of the adjusting element, the snap-in means located on the adjusting element is provided in an area of the adjusting element that is laterally offset in relation to the second contact surface.

18. Device according to claim 17, characterized in that the lateral area is located on a finger-like part extending in the direction of actuation of the adjusting element. displays a first supporting surface that is inclined towards the side displaying the snap-in means in the direction of actuation, and the sliding element displays a second supporting surface that runs towards the side displaying the projection in the direction of actuation of the adjusting element and interacts with the first supporting surface, such that the snap-in means can be guided against each other when the adjusting element is displaced in the direction of actuation.

19. Device according to claim 1, characterized in t h at the adjusting element displays an actuating area, which is located between the first and second part and accessible from the outside, such that the adjusting element can be moved in the direction of actuation, and the second contact surface displaced along the first contact surface, to compensate for the play between the two parts, by applying pressure to the actuating area with a suitable tool.

20. Device according to claim 19, characterized in that, on its end facing in the direction opposite to the direction of actuation (R), the adjusting element (8) has an actuating area (29) projecting from the sliding element (6) into a gap between the two parts (1, 2), said actuating area (29) being accessible from a face end of the parts (1, 2), such that the adjusting element (8) can be displaced in its direction of actuation (R) by actuating a tool (30) that extends into the gap from the face end and acts on the actuating area (29).

21. Device according to claim 20, characterized in that the actuating area (29) displays a run-up surface (31) that is inclined or has a convex curvature in relation to the direction of movement of the two parts (1, 2) in the direction of actuation (R) of the adjusting element (8), to which pressure can be applied by displacing a tool (30) that can be positioned in the gap between the two parts (1, 2) and operated from outside the two parts.

22. Device according to claim 1, characterized in that it is designed as a telescopic column with at least two tubular parts that are located one inside the other and can be displaced relative to each other along their sliding surfaces in the longitudinal direction.

23. Device according to claim 22, characterized in that the first and the second part display essentially rectangular cross-sections and thus essentially flat opposite sides.

24. Device according to claim 23, characterized in that at least two adjacent sides of the first part (1) are each provided with two sliding bearings (3), spaced apart from each other in the transverse direction and in a minor-inverted arrangement relative to the perpendicular center plane of the corresponding side running in the longitudinal direction.

25. Device according to claim 24, characterized in that the sliding element (6) of each sliding bearing (3) displays two first contact surfaces (7) that are spaced apart from each other in the longitudinal direction of the telescopic column, inclined towards the corresponding side in the transverse direction, and interact with the second contact surfaces (9) of an adjusting element (8) that can be displaced in the transverse direction.

26. Device according to claim 23, characterized in that at least two adjacent sides of the first part are each provided with a sliding bearing, the sliding element of which displays two areas, connected to each other and spaced apart in the longitudinal direction of the telescopic column, where each area displays first contact surfaces that are spaced apart in the transverse direction, inclined towards the corresponding side in the longitudinal direction of the telescopic column, and interact with the second contact surfaces of an adjusting element that can be displaced in the longitudinal direction of the telescopic column.

27. Device according to claim 26, characterized in that the adjusting element displays a first area interacting with one of the areas of the sliding element, on the one face end of which the actuating area is provided, and a second area interacting with the other area of the sliding element, which is connected to the first area by a bridge part, in which context the bridge part extends between the two first contact surfaces of the sliding element adjacent to the first area of the adjusting element.

28. Device according to claim 27, characterized in that the sliding bearing is of one-piece design, at least in its as-manufactured condition, where the sliding element and the adjusting element are joined to each other via connections, and where, in the as-manufactured condition, the first and the second area of the adjusting element are located a distance apart from the two areas of the sliding element respectively interacting with them in the longitudinal direction of the telescopic column, such that, when the adjusting element is displaced in the longitudinal direction of the telescopic column relative to the sliding element by applying pressure to the actuating area, the connections break or are stretched in such a way that the second contact surfaces of the first and second area of the adjusting element can be slid onto the first contact surfaces in the two areas of the sliding element.

29. Device according to claim 28, characterized in that the adjusting element and the sliding element are, apart from the projections, formed as a plate, where the side surfaces are arranged in coplanar fashion in the as-manufactured condition.

* * * * *

UNITED STATES PATENT AND TRADEMARK OFFICE
CERTIFICATE OF CORRECTION

PATENT NO. : 8,636,436 B2  
APPLICATION NO. : 13/049048  
DATED : January 28, 2014  
INVENTOR(S) : Roither et al.

It is certified that error appears in the above-identified patent and that said Letters Patent is hereby corrected as shown below:

In the Claims

In column 18, line 35, in claim 13, after "element" insert -- displays a first supporting surface that is inclined towards the side displaying the snap-in means in the direction of actuation, and the sliding element displays a second supporting surface that runs towards the side displaying the projection in the direction of actuation of the adjusting element and interacts with the first supporting surface, such that the snap-in means can be guided against each other when the adjusting element is displaced in the direction of actuation --, therefor.

In column 18, line 54, in claim 18, after "element." delete "displays a first supporting surface that is inclined towards the side displaying the snap-in means in the direction of actuation, and the sliding element displays a second supporting surface that runs towards the side displaying the projection in the direction of actuation of the adjusting element and interacts with the first supporting surface, such that the snap-in means can be guided against each other when the adjusting element is displaced in the direction of actuation.", therefor.

Signed and Sealed this  
Tenth Day of March, 2015

Michelle K. Lee  
*Deputy Director of the United States Patent and Trademark Office*